(12) United States Patent
Lin

(10) Patent No.: US 8,593,412 B2
(45) Date of Patent: Nov. 26, 2013

(54) DISPLAY DEVICE

(75) Inventor: Hsi-Yang Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 660 days.

(21) Appl. No.: 12/650,558

(22) Filed: Dec. 31, 2009

(65) Prior Publication Data

US 2011/0025616 A1  Feb. 3, 2011

(51) Int. Cl.
*G06F 3/041* (2006.01)

(52) U.S. Cl.
USPC .......................................................... 345/173

(58) Field of Classification Search
USPC .................. 361/679.01, 679.27; 345/173
See application file for complete search history.

(56) References Cited

U.S. PATENT DOCUMENTS

| | | | |
|---|---|---|---|
| 7,623,341 B1* | 11/2009 | Salvat et al. | 361/679.01 |
| 2004/0027312 A1* | 2/2004 | Owada et al. | 345/8 |
| 2006/0197750 A1* | 9/2006 | Kerr et al. | 345/173 |
| 2007/0030636 A1* | 2/2007 | Kim | 361/683 |
| 2008/0100589 A1* | 5/2008 | Tsao | 345/173 |

* cited by examiner

*Primary Examiner* — Quan-Zhen Wang
*Assistant Examiner* — Tony Davis
(74) *Attorney, Agent, or Firm* — Altis & Wispro Law Group, Inc.

(57) ABSTRACT

A display device includes a lid with a window defined in a base wall thereof, a touch panel attached to the base wall in alignment with the window, and a plurality of positioning members. The are slidably attached to the base wall around the window for adjustably bracketing the touch panel therebetween.

20 Claims, 7 Drawing Sheets

DISPLAY DEVICE

BACKGROUND

1. Technical Field

The disclosure relates to a display device.

2. Description of Related Art

LCD display devices have become increasingly popular for general use. However, touch panels of the LCD display devices are usually fixedly retained in the display devices by fixing apparatus and cannot be replaced for another touch panel of different size and still use the original fixing apparatus.

DETAILED DESCRIPTION

Figure 1:
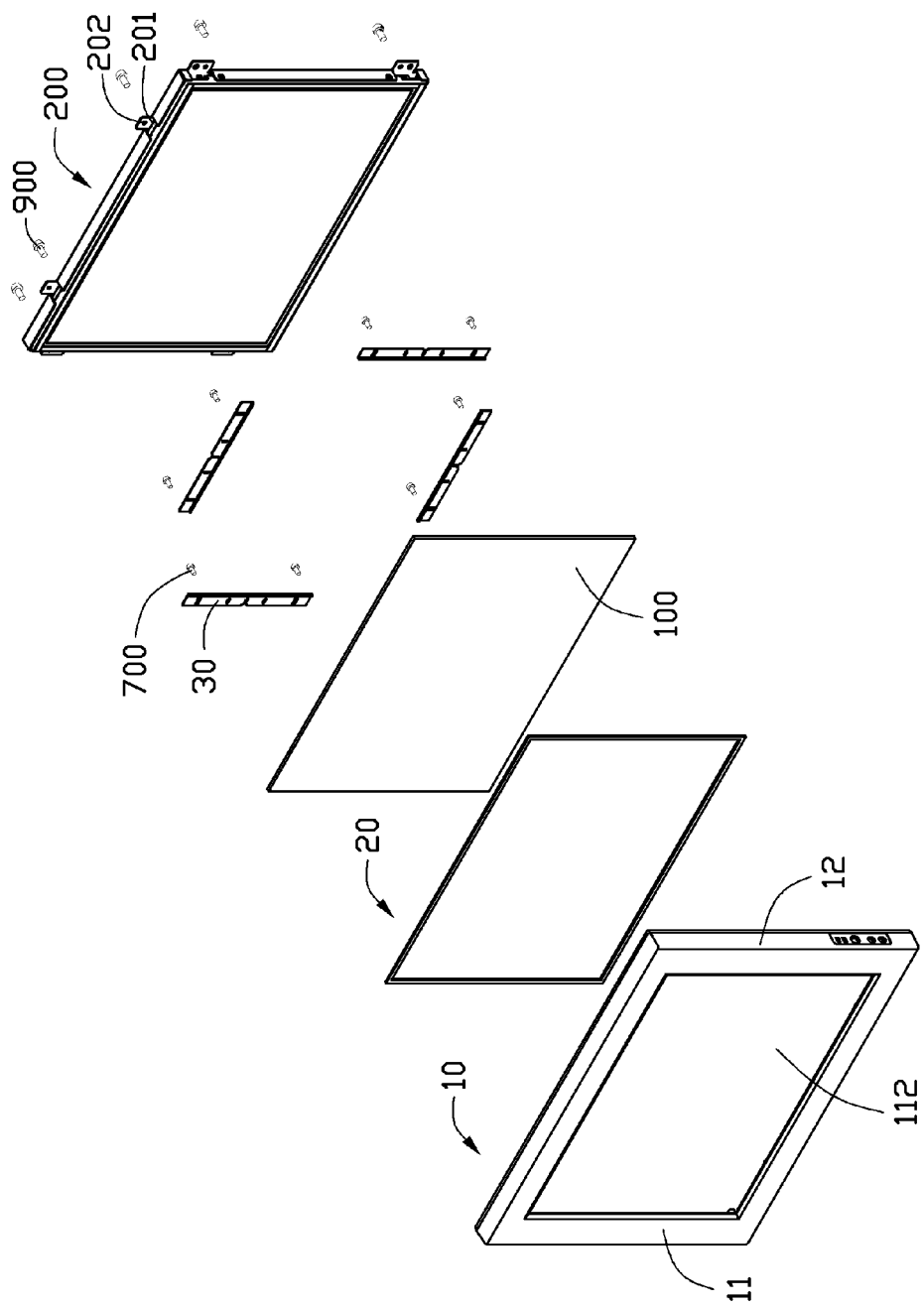
FIG. 1 is an exploded, isometric view of a first exemplary embodiment of a display device.
Figure 2:
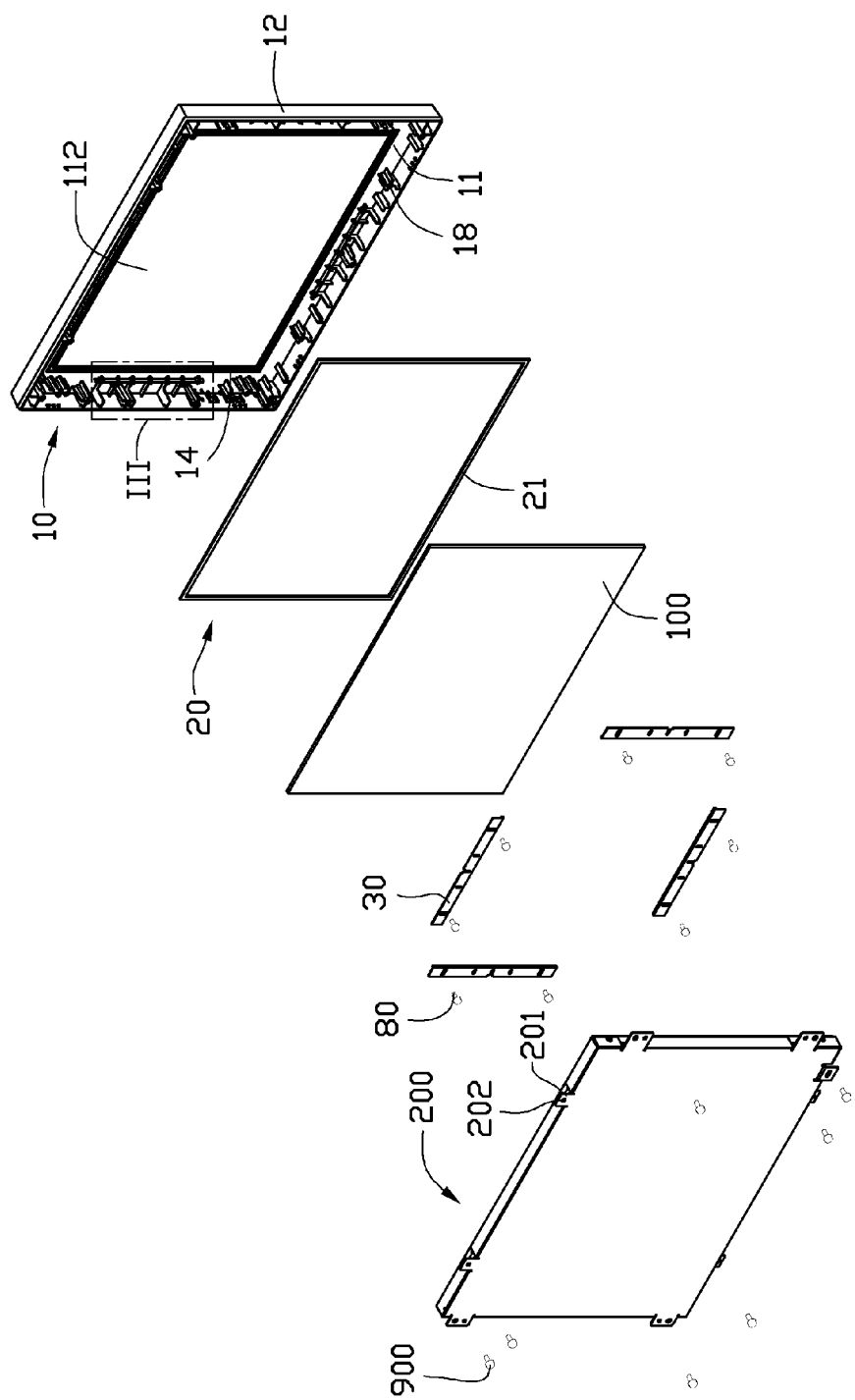
FIG. 2 is an exploded, isometric view of the display device of FIG. 1, but viewed from another perspective.

Referring to FIGS. 1-2, a first exemplary embodiment of a display device is provided which can accept different sizes touch panels mounted therein. The display device includes a lid 10, a splash guard 20, a touch panel 100, four positioning members 30, a liquid crystal display panel 200, and a plurality fastening members 700, 800, 900.

Figure 3:
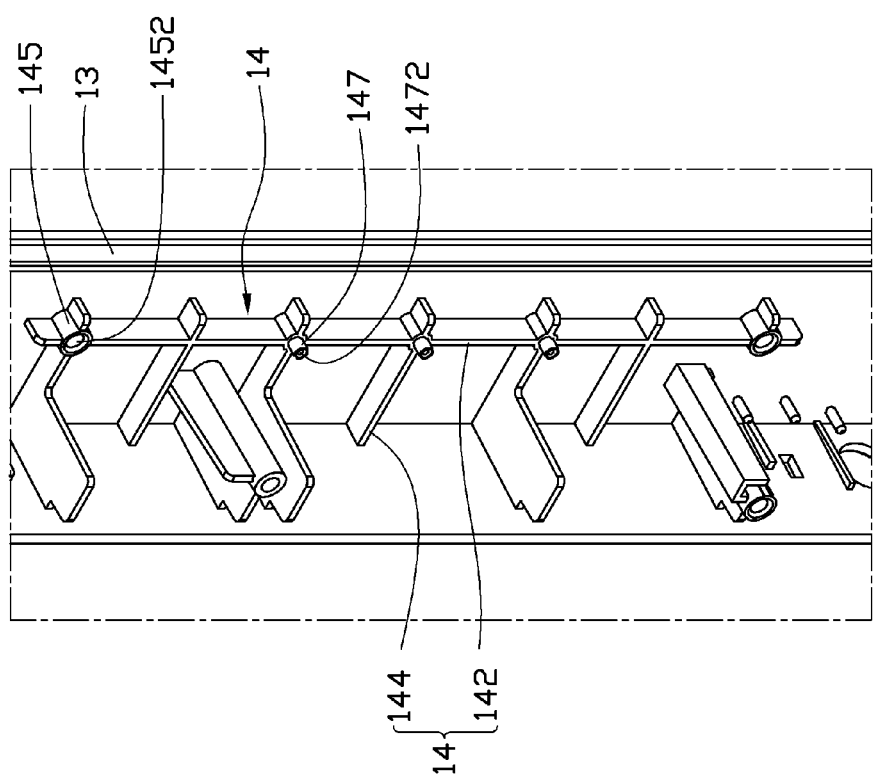
FIG. 3 is an enlarged view of an encircled portion III of FIG. 2.

Referring also to FIG. 3, the lid 10 includes a rectangular base wall 11, and four sidewalls 12 extending perpendicularly from edges of the base wall 11. A rectangular window 112 is defined in the base wall 11. A groove 13 is defined in an inside of the base wall 11 around the window 112. A support frame 14 is formed at the inside of the base wall 11 between each of the sidewalls 12 and the groove 13. Each of the frames 14 includes a latitudinal bar 142 parallel to the corresponding sidewall 12, and a plurality of longitudinal bars 144 perpendicularly crossed with the latitudinal bar 142. A pair of fixing posts 145 is formed at two opposite end nodes formed between the latitudinal bar 142 and longitudinal bars 144. A plurality of positioning posts 147 is formed at the other nodes formed between the latitudinal bar 142 and the longitudinal bars 144. A threaded hole 1452 is defined in each of the fixing posts 145. A threaded hole 1472 is defined in each of the positioning posts 147. A plurality of buttons is formed at an outside of one of the sidewalls 12 (shown in FIG. 1). A plurality of pillars 18 with fixing holes extends from the inside of the base wall 11.

The splash guard 20 is generally rectangular.

Figure 4:
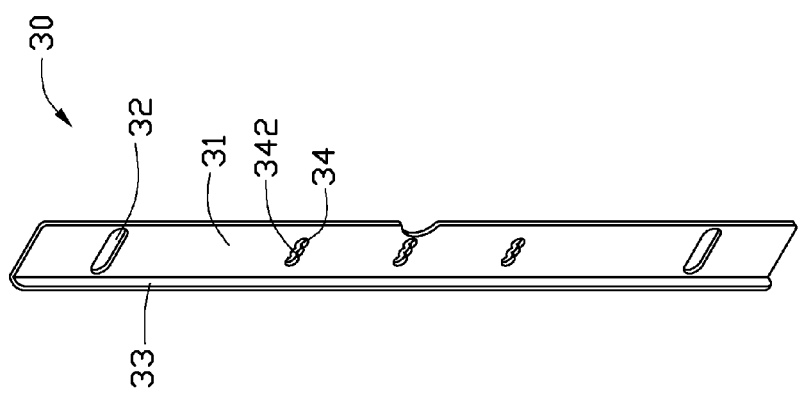
FIG. 4 is an enlarged view of a position member of the display device of FIG. 1.

Referring to FIG. 4, each of the positioning members 30 is longwise and defines a generally L-shaped cross section. Each of the positioning members 30 includes a rectangular first plate 31, and a second plate 33 extending perpendicularly from a long edge of the first plate 31. A pair of sliding slots 32 extending perpendicular to the second plate 33 is defined in the first plate 31, respectively adjacent to opposite ends of the first plate 31. A plurality of positioning slots 34 is defined in the first plate 31, located between the two sliding slots 32. The positioning slots 34 extend perpendicular to the second plate 33. Each of the positioning slots 34 is formed by a plurality of fixing holes 342 partially overlapped at adjoining portions thereof.

The liquid crystal display panel 200 is generally rectangular and includes a plurality of tabs 201 extending from four sidewalls thereof. A through hole 202 is defined in each of the tabs 201.

Figure 5:
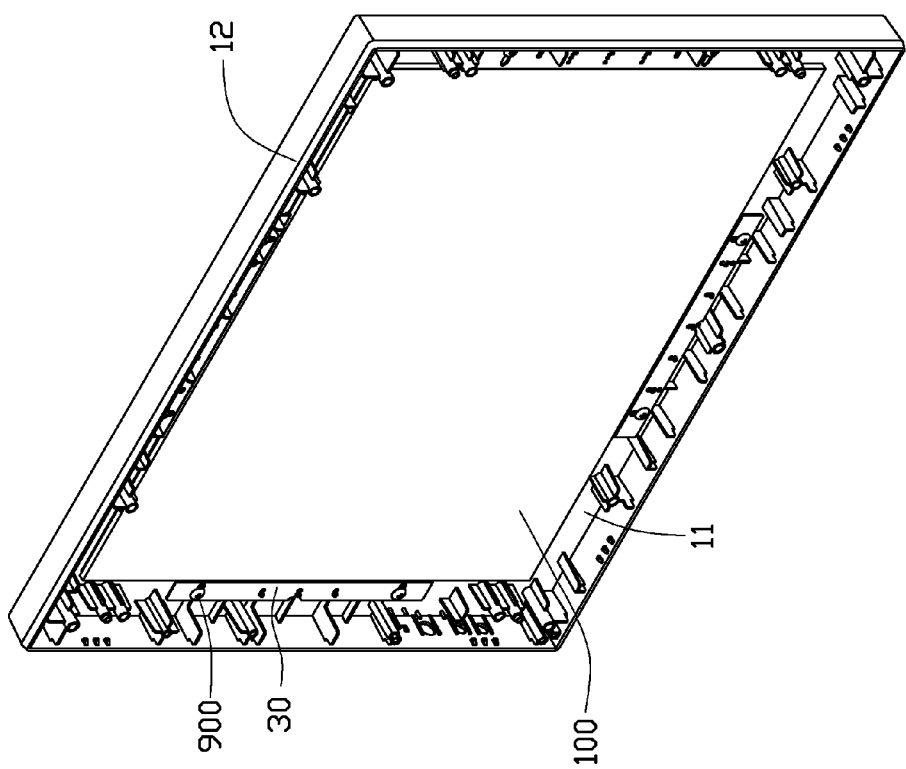
FIG. 5 is a partially assembled, isometric view of the display device of FIG. 2.
Figure 6:
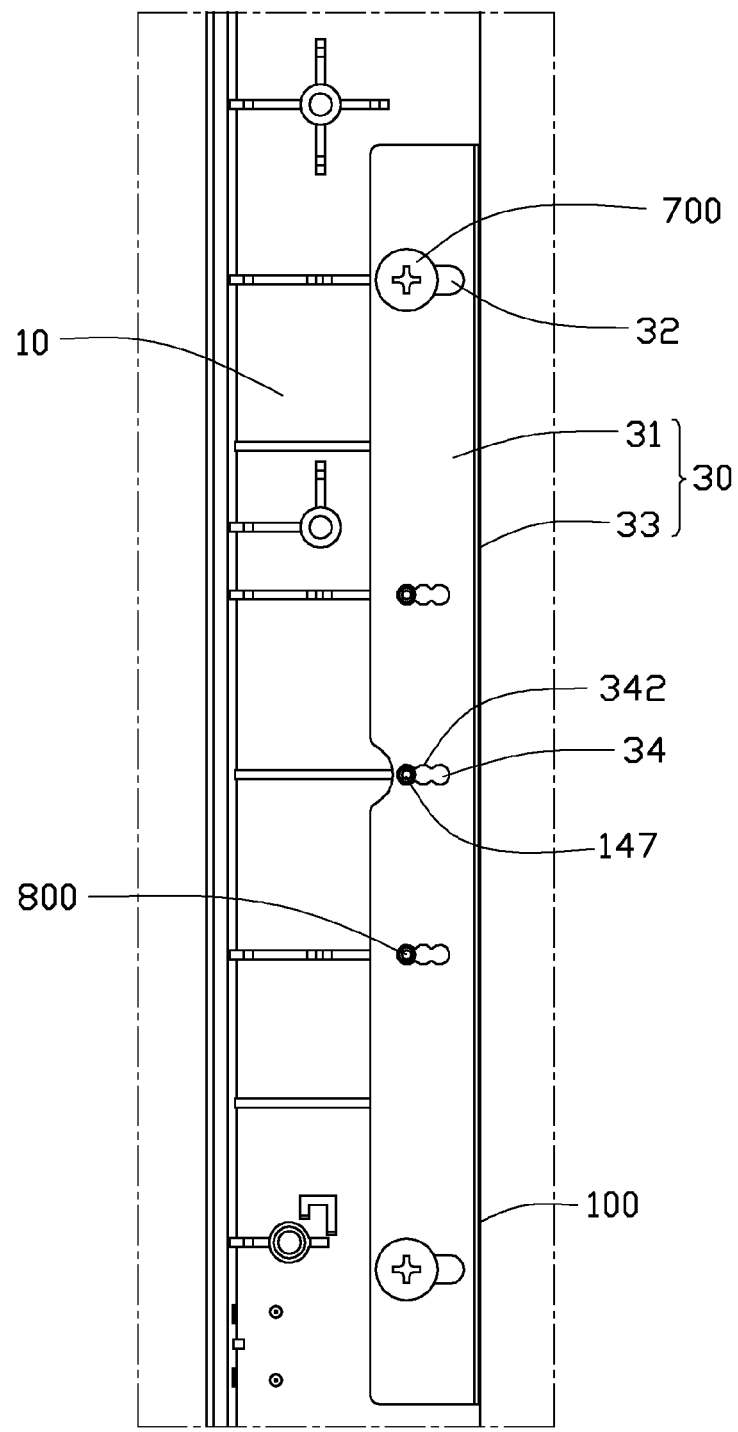
FIG. 6 is an enlarged, partial planar view of the display device of FIG. 5.

Referring to FIGS. 5 and 6, in assembly, the splash guard 20 is received in the groove 13 of the lid 10. The touch panel 100 is placed on the base wall 11 of the lid 10, in alignment with the window 112 and abutting against the splash guard 20. The positioning members 30 are attached to frames 14 of the lid 10, respectively. The first plate 31 of each position member 30 is supported on the corresponding frame 14. The second plate 33 of each position member 30 is located adjacent to the window 112 of the lid 10, with the fixing posts 145 slidably engaging in the sliding slots 32 and the positioning posts 147 selectively engaging in one of the fixing holes 342 of the positioning slots 34. The positioning members 30 are slidably adjusted so that the second plates 31 of the positioning members 30 is capable of abutting the sides of the touch panel 100. The fasteners 700 engage in the threaded holes 1452 of fixing posts 145 of the frames 14 and abut against the first plates 31 of the positioning members 30. The fasteners 800 engage in the threaded holes 1472 of the positioning posts 147 of positioning members 30 and abut against the first plates 31 of the positioning members 30. Then, the display panel 200 is attached to the lid 10. The fasteners 900 extend through the through holes 202 of the display panel 200 to engage in the fixing holes of the pillars 18 of the lid 10.

Figure 7:
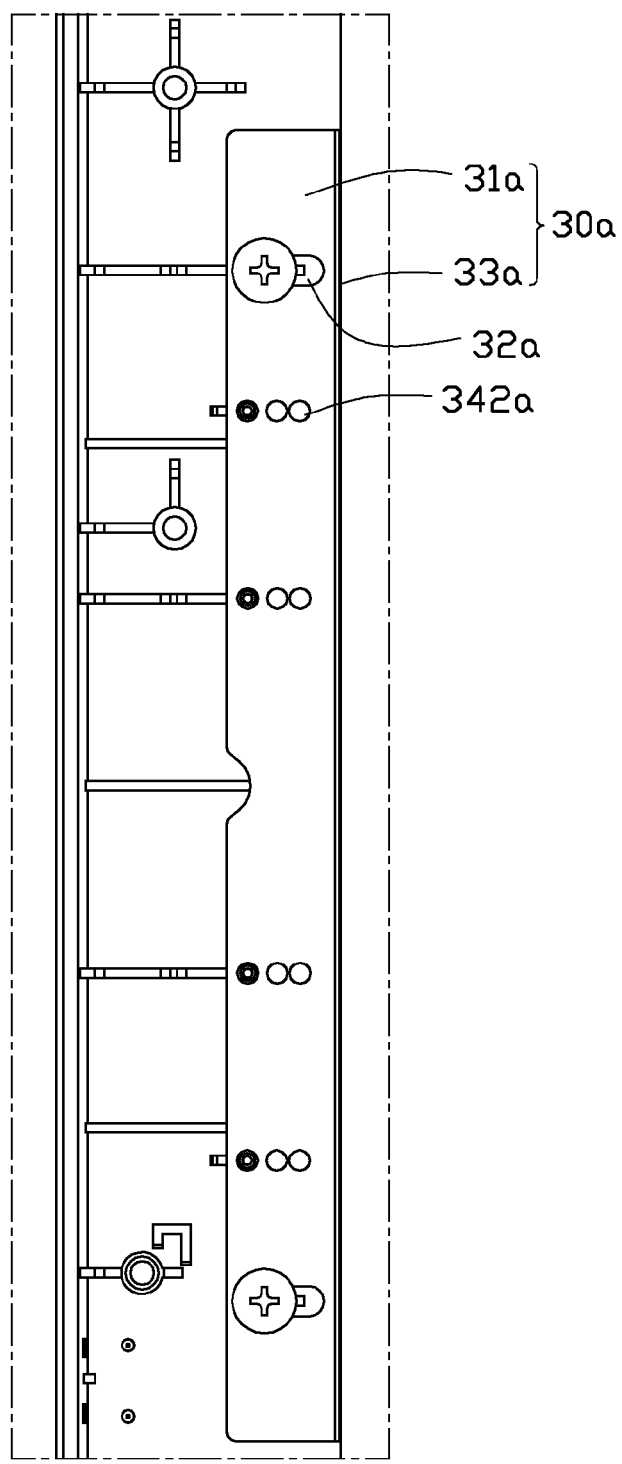
FIG. 7 is an enlarged, partial planar view of a second exemplary embodiment of the display device.

Referring to FIG. 7, a second exemplary embodiment of the display device has a similar configuration to the first exemplary embodiment, except the positioning members 30a. Each of the positioning members 30a includes a first plate 31a, and a second plate 33a perpendicular to the first plate 31a. The first plate 31a includes a pair of sliding slots 32a, and a plurality of lines of spaced fixing holes 342 located between the two sliding slots 32a. Each line of the fixing holes 342 is perpendicular to the second plate 33a of the fixing members 30a.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A display device for attaching touch panels with different sizes, the display device comprising:

a lid defining a window in a base wall thereof;

a plurality of positioning posts formed on the base wall around the window;

a rectangular touch panel attached to the lid and exposed through the window; and four longwise positioning members slidably attached to the base wall of the lid around the window, and respectively abutting against four sides of the touch panel to bracket the touch panel thereamong, wherein a distance between opposite two of the positioning members is adjustable corresponding to the size of the touch panel by sliding the positioning members, each positioning member defines a plurality of fixing holes partially overlapped at adjoining portions, each positioning post selectively engages in one of the fixing holes of a corresponding positioning member.

2. The display device of claim 1, wherein the base wall and the window of the lid are rectangular, and the display device further comprises four frames formed at insides of the base wall adjacent four sides of the window for attaching the positioning members.

3. The display device of claim 2, wherein each positioning member comprises a first plate and a second plate perpendicular to the first plate, the first plate is attached to the corresponding frame, and the second plate is configured for abutting a corresponding side of the touch panel.

4. The display device of claim 3, wherein each frame comprises a pair of fixing posts, the plurality of positioning posts is formed on the frames and is located between the corresponding pair of fixing posts, and the first plate comprises a pair of sliding slots defined therein for slidably engaging with the fixing posts.

5. The display device of claim 4, wherein the each frame further comprises a first bar and a plurality of second bars perpendicularly crossed with the first bar, the fixing posts are formed at two opposite nodes formed between the first and second bars, and the positioning posts are formed at the other nodes formed between the first and second bars.

6. The display device of claim 3, wherein the fixing holes are defined in the first plate.

7. A display device for attaching touch panels with different sizes, the display device comprising:
a lid defining a window in a base wall thereof;
a plurality of positioning posts formed on the base wall around the window;
a rectangular touch panel attached to the lid and exposed through the window; and
four longwise positioning members slidably attached to the base wall of the lid around the window, and respectively abutting against four sides of the touch panel to bracket the touch panel thereamong, wherein a distance between opposite two of the positioning members is adjustable corresponding to the size of the touch panel by sliding the positioning members, each positioning member defines a plurality of lines of spaced fixing holes, and each positioning post selectively engages in one of the fixing holes of a corresponding positioning member.

8. The display device of claim 7, wherein the base wall and the window of the lid are rectangular, the display device further comprises four frames formed at insides of the base wall adjacent four sides of the window for attaching the positioning members.

9. The display device of claim 8, wherein each positioning member comprises a first plate and a second plate perpendicular to the first plate, the first plate is attached to the corresponding frame, and the second plate is configured for abutting a corresponding side of the touch panel.

10. The display device of claim 9, wherein each frame comprises a pair of fixing posts, the plurality of positioning posts is formed on the frames and is located between the corresponding pair of fixing posts, and the first plate comprises a pair of sliding slots defined therein for slidably engaging with the fixing posts.

11. The display device of claim 10, wherein the each frame further comprises a first bar and a plurality of second bars perpendicularly crossed with the first bar, the fixing posts are formed at two opposite nodes formed between the first and second bars, and the positioning posts are formed at the other nodes formed between the first and second bars.

12. The display device of claim 9, wherein the fixing holes are defined in the first plate.

13. A display device for attaching touch panels with different sizes, the display device comprising:
a lid defining a window in a base wall thereof;
a rectangular touch panel attached to the lid and exposed through the window; and
four longwise positioning members slidably attached to the base wall of the lid around the window, and respectively abutting against four sides of the touch panel to bracket the touch panel thereamong, wherein each positioning member is operable to slide along a direction perpendicular to a lengthwise direction of the positioning member, and a distance between opposite two of the positioning members is adjustable corresponding to the size of the touch panel by sliding the positioning members.

14. The display device of claim 13, wherein the base wall and the window of the lid are rectangular, and the display device further comprises four frames formed at insides of the base wall adjacent four sides of the window for attaching the positioning members.

15. The display device of claim 14, wherein each positioning member comprises a first plate and a second plate perpendicular to the first plate, the first plate is attached to the corresponding frame, and the second plate is configured for abutting a corresponding side of the touch panel.

16. The display device of claim 15, wherein each frame comprises a pair of fixing posts and a plurality of positioning posts located between the fixing posts, the first plate comprises a pair of sliding slots defined therein for slidably engaging with the fixing posts, and a plurality of positioning slots defined between the sliding slots for selectively engaging with the positioning posts.

17. The display device of claim 16, wherein each positioning slot comprises a plurality of fixing holes partially overlapped at adjoining portions.

18. The display device of claim 17, wherein the each frame further comprises a first bar and a plurality of second bars perpendicularly crossed with the first bar, the fixing posts are formed at two opposite nodes formed between the first and second bars, and the positioning posts are formed at the other nodes formed between the first and second bars.

19. The display device of claim 15, wherein each frame comprises a pair of fixing posts and a plurality of positioning posts located between the fixing post, the first plate comprises a pair of sliding slots defined therein for slidably engaging with the fixing posts, and a plurality of lines of spaced fixing holes between the sliding slots for selectively engaging with the positioning posts.

20. The display device of claim 13, further comprising a display panel attached to the base wall of the lid, wherein the display panel comprises a plurality of tabs extending from sides thereof, a through hole is defined in each of the tabs, a plurality of pillars extends from the inside of the base wall, and a plurality of fasteners extends through the through holes of the tabs to engage in the pillars.

* * * * *